(12) United States Patent
Iler et al.

(10) Patent No.: US 6,898,350 B2
(45) Date of Patent: May 24, 2005

(54) INTERFEROMETRIC FOCUSING TECHNIQUE FOR FORMING TAPS IN FIBERS

(75) Inventors: Amber Iler, Ann Arbor, MI (US); Alex Klooster, Ann Arbor, MI (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 0 days.

(21) Appl. No.: 10/643,437

(22) Filed: Aug. 19, 2003

(65) Prior Publication Data

US 2004/0081400 A1 Apr. 29, 2004

Related U.S. Application Data

(63) Continuation-in-part of application No. 09/765,215, filed on Jan. 18, 2001, now Pat. No. 6,611,645.

(51) Int. Cl.[7] ................................................. G02B 6/34
(52) U.S. Cl. ............................................................ 385/37
(58) Field of Search .............................. 385/2, 4, 8, 10, 385/14–17, 27, 31, 37, 40, 48, 123, 130, 131, 901

(56) References Cited

U.S. PATENT DOCUMENTS

| | | | |
|---|---|---|---|
| 5,061,032 A | 10/1991 | Meltz et al. | |
| 5,351,321 A | 9/1994 | Snitzer et al. | |
| 5,400,422 A | 3/1995 | Askins et al. | |
| 5,619,603 A | 4/1997 | Epworth et al. | |
| 5,655,040 A | 8/1997 | Chesnoy et al. | |
| 5,675,691 A | 10/1997 | Edlinger et al. | |
| 5,694,248 A | 12/1997 | Erdogan et al. | |
| 5,830,622 A | 11/1998 | Canning et al. | |
| 5,832,156 A | 11/1998 | Strasser et al. | |
| 5,850,302 A | 12/1998 | Strasser et al. | |
| 5,912,999 A | 6/1999 | Brennan, III et al. | |
| 5,914,207 A | 6/1999 | Nishiki et al. | |
| 5,945,261 A | 8/1999 | Rourke | |
| 6,072,926 A | 6/2000 | Cole et al. | |
| 6,084,998 A | 7/2000 | Straayer | |
| 6,137,612 A | 10/2000 | Startup | |
| 6,178,045 B1 | 1/2001 | Cook et al. | |
| 6,201,911 B1 | 3/2001 | Jang | |
| 6,269,208 B1 | 7/2001 | Bhatia et al. | |
| 6,310,996 B1 | 10/2001 | Byron | |
| 6,334,018 B1 | 12/2001 | Fokine | |
| 6,347,171 B1 | 2/2002 | Tatah et al. | |
| 6,384,977 B1 | 5/2002 | Laming et al. | |
| 6,404,956 B1 | 6/2002 | Brennan, III et al. | |
| 6,414,764 B1 | 7/2002 | Ouellette | |
| 6,434,300 B1 | 8/2002 | Hammon et al. | |
| 6,549,705 B1 | 4/2003 | Laming et al. | |
| 6,555,163 B2 | 4/2003 | Hirayama | |

*Primary Examiner*—Khiem Nguyen
(74) *Attorney, Agent, or Firm*—Gifford, Krass, Groh, Sprinkle, Anderson & Citkowski, PC

(57) ABSTRACT

Techniques are used to determine when interfering beams of light are precisely aligned at the core of the fiber when a laser interferometer is used to burn diffraction gratings into optical fibers. Two alternative methods are disclosed for performing this function, namely, refraction of the UV fluorescence through the fiber onto a paper or screen, and alternately interrupting the left and right UV beams, then directly observing the fluorescence pattern of the UV beam on the fiber core to determine alignment.

7 Claims, 2 Drawing Sheets

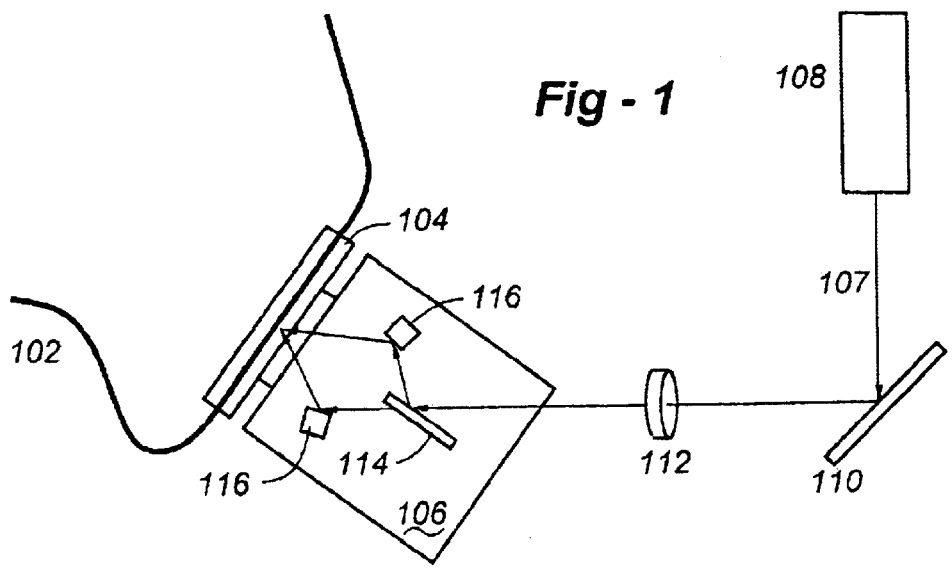
Fig - 1
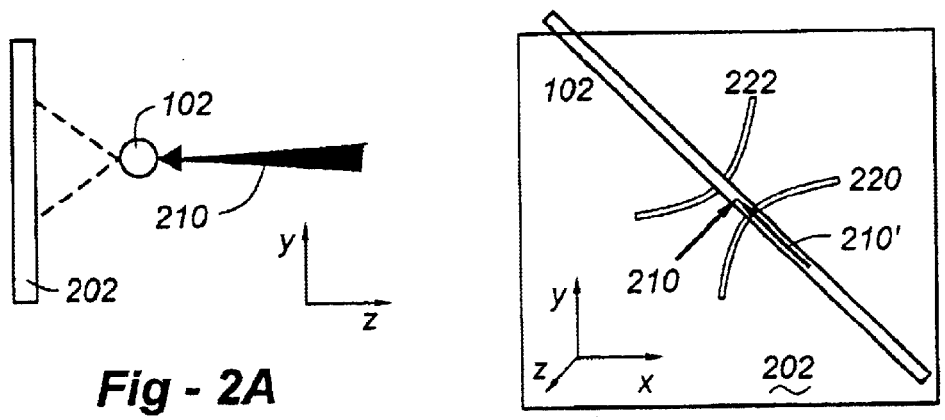
Fig - 2A
Fig - 2B
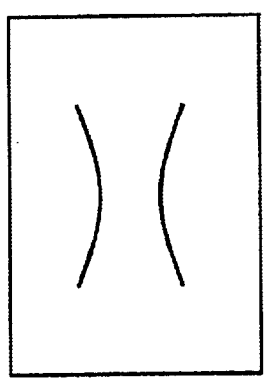
Fig - 3A
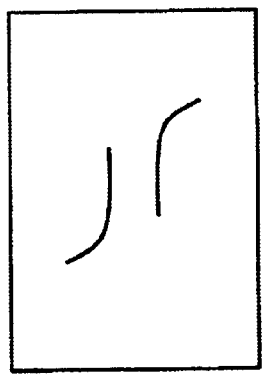
Fig - 3B
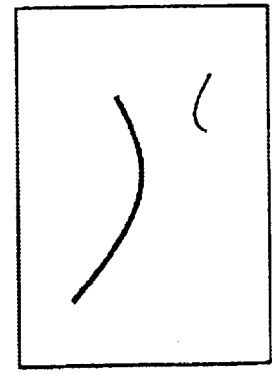
Fig - 3C

INTERFEROMETRIC FOCUSING TECHNIQUE FOR FORMING TAPS IN FIBERS

REFERENCE TO RELATED APPLICATION

This application is a continuation-in-part of U.S. patent application Ser. No. 09/765,215, filed Jan. 18, 2001 now U.S. Pat. No. 6,611,645, the entire content of which is incorporated herein by reference.

FIELD OF THE INVENTION

This invention relates generally to optical gratings embedded within the core of an fiber and, more particularly, to apparatus and methods for ensure that interfering beams of light used to form the gratings are precisely aligned at the core region.

BACKGROUND OF THE INVENTION

Various gratings and interferometers have been used to extract the power spectrum of light carried by an optical fiber, including gratings embedded within the core of the fiber itself. As one example, U.S. Pat. No. 5,850,302 discloses an optical waveguide communication system including an optical fiber having a refractive index grating and coupling means selected such that at least a portion of the light is transferred from a guided mode into a radiation mode and is available for utilization by utilization means (e.g., a detector) outside of the waveguide and the coupling means. The optical fiber comprises a chirped and blazed refractive index Bragg grating selected such that at least a portion of the light in the guided mode is transferred into a non-guided mode.

As fiber optic technology continues to grow, the creation of various diffraction gratings within the fibers will become increasingly common. Our co-pending U.S. patent application Ser. No. 09/765,215, incorporated herein by reference, describes a two-dimensional, fiber-delay radiator (FDR). The device is made with optical-fiber taps forming Bragg gratings orientated at 45 degrees to the fiber core, permitting light to emerge directly out of the side of the fiber, linearly polarized. The optical fiber is wound on a cylindrical-like form such that a number of loops of the fiber are available for making a number of taps on each loop. Taps are preferably generated along each loop of the fiber so that a small portion of the light propagating in the fiber will exit sideways from fiber at the taps. A lens system is then used to capture the light from the taps and produce a Fourier Transform of the total distribution of light from all the taps. A video camera then captures this Fourier Transform light and the power spectrum of the light signal is displayed on a monitor.

The preferred construction of the FDR would include taps with "ideal" phase characteristics. To achieve this goal, a phase spatial light modulator may be used to correct and modify the tap phases. Another embodiment uses a coherent reference wave to generate a holographic optical element (or complex spatial light modulator) to correct the tap phases and amplitudes. According to this technique, a coherent reference source and a detector array are used to capture the radiation amplitude pattern of the FDR. Then, with digital processing of the captured pattern, the desired spectral signal properties are obtained.

While it is known to use an ultraviolet (UV) laser interferometer to burn diffraction gratings into optical fibers, it is critically important that the two UV beams of light are caused to converge at precisely the core of the fiber. Accordingly, there is an outstanding need to develop techniques to determine when the two (invisible) UV beams are precisely aligned at the core of the fiber.

SUMMARY OF THE INVENTION

Broadly, the invention uses an ultraviolet (UV) laser interferometer to burn diffraction gratings into optical fibers and more importantly, involves techniques to determine when the two (invisible) UV beams are precisely aligned at the core of the fiber. Two alternative methods are disclosed for performing this function, namely, refraction of the UV fluorescence through the fiber onto a paper or screen, and alternately interrupting the left and right UV beams, then directly observing the fluorescence pattern of the UV beam on the fiber core to determine alignment.

BRIEF DESCRIPTION OF THE DRAWINGS

FIG. 1 shows a basic ultraviolet (UV) interferometer set-up for making fiber optic diffraction gratings;

FIG. 2A is a schematic showing UV light fluorescing onto paper placed behind the fiber;

FIG. 2B is a side view of the instrumentation of FIG. 1;

FIG. 3A is an example of a UV fluorescence pattern indicating proper focus;

FIG. 3B shows the shapes that might indicate that a fiber is focused in the Z axis, but unfocused in X and/or Y (i.e., tilted);

FIG. 3C indicates that a fiber is not focused properly in any dimension;

DETAILED DESCRIPTION OF THE INVENTION

Figure 4:
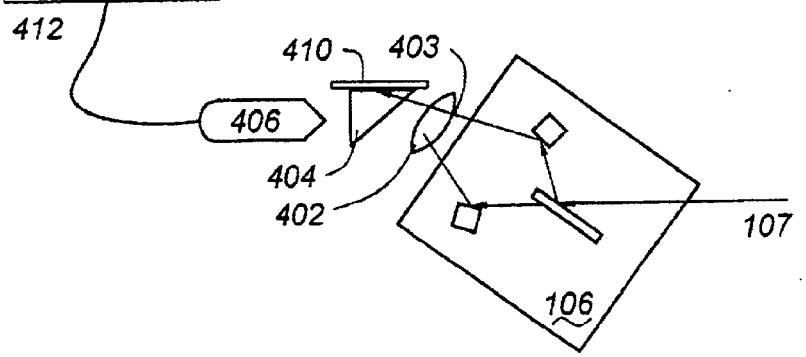
FIG. 4 illustrates how the chopper is used in the second UV interferometer focusing method.

This invention resides in apparatus and methods to "burn" diffraction gratings into optical fibers. Although the technique is certainly applicable to the FDR system described in the co-pending application referenced above, this invention is not limited in this regard, and may be extended to any other application that would utilize or benefit from such tap formation. In addition, although methods are described for focusing UV interferometer beams, same techniques may also be used at other wavelengths, but is particularly useful for non-visible wavelengths such as UV light.

Broadly, the invention uses an ultraviolet (UV) laser interferometer to burn diffraction gratings into the optical fibers. Referring to FIG. 1, fiber 102 is held in position using a holder 104 adjacent an interferometer 106. The beam 107 of a UV laser 108 is redirected by optional mirror 110 and focused by optics 112 onto a beamsplitter 114 in the interferometer 106. The two beams from the splitter 114 are directed by mirrors 116 into the core of the fiber 102, as shown. In the preferred embodiment, two UV beams of light are caused to converge at precisely the core of the fiber. When the two UV beams interfere at the core of the fiber, they create a diffraction pattern, and the intense UV laser light burns a diffraction grating into the fiber's core, as desired.

It was important, however, to develop techniques to determine when the two (invisible) UV beams are precisely aligned at the core of the fiber. Two alternative methods are disclosed herein for performing this function, as follows. Both techniques will then be described in detail.

1) Refraction of the U fluorescence through the fiber onto a screen.
2) Using a chopper to alternately interrupt the left and right UV beams, then directly observing the fluorescence pattern of the Uv beam on the fiber core to determine alignment.

Method 1

This method uses refraction of the UV fluorescence through the fiber onto a screen. According to this approach, a characteristic pattern of refraction through the fiber is examined to determine when the proper alignment was achieved in all three spatial dimensions. FIG. 2A is a side view of the instrumentation used to carry out this process, and FIG. 2B is a perspective view looking toward the fiber from the interferometer. In FIG. 2A, the fiber comes out of the page at a 45 degree angle, and in FIG. 2B, the beam paths 210, 210' are tilted out of the page along the Z axis. A piece of UV fluorescing paper, or a conversion screen 202, is placed on the side of the fiber 102 opposite to the U beam paths 210. Due to the cylindrical shape of the fiber and the non-normal UV incident beams, the UV light is refracted for each of the beams and creates "C" shapes on the screen or paper. As shown in FIG. 2B, one of the UV beams creates a right-hand "C" shape 220, whereas the other beam creates the left-hand backwards C" shape 222.

It was discovered that when the UV beam paths overlapped at the core, the "C" shapes on the fluorescing paper were nearly equal in shape, as shown in FIG. 3A. If there was any misalignment, the shapes became very different in appearance, and sometimes one of them would even disappear. In FIG. 3B, for example, the shapes might indicate that the fiber is focused in the Z axis, but unfocused in X and/or Y (i.e., tilted). In FIG. 3C, given that one of the curves is nearly obliterated, this would indicate that the fiber is not focused properly in any dimension.

Method 2

This method uses a chopper to alternately interrupt the left and right UV beams, then directly observing the fluorescence pattern of the UV beam on the fiber core to determine alignment. This method evolved from working with multiple fibers in a plane. Because the fibers were now stacked with respect to the interferometer, they blocked a user from seeing the UV patterns on the fluorescing paper. Therefore, it became necessary to develop a technique to determine the location of the invisible UV beams by directly observing them as they impinged on the fibers.

The set-up for this method is shown in FIG. 4 from a top-down perspective. The system involves using a chopper 402 to alternately interrupt the left and right UV beams. The open area of the chopper is shown at 403. A right-angle prism 404 and CCD camera 406 to allow viewing of the UV fluorescence radiating from the fiber stack 410 on a monitor 412. Note that is was found necessary to alternate the beams to avoid accidentally forming a diffraction grating in the fiber while aligning the beams.

Figure 5:
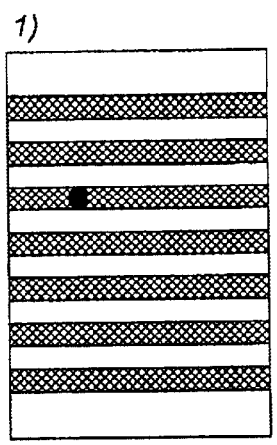
FIG. 5 shows a mock sequence of what the CCD camera displays during UV interferometer focusing.
Figure 5:
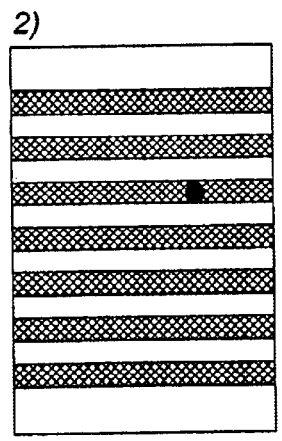
Figure 5:
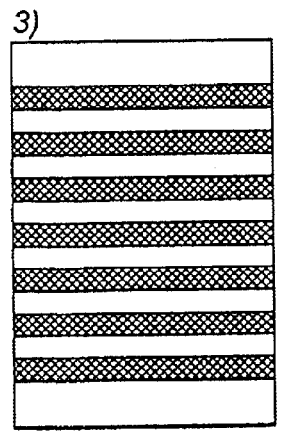
Figure 5:
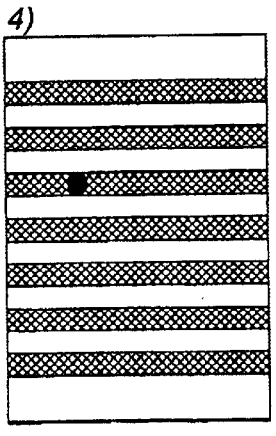

A mock sequence 1), 2), 3), 4) of what the CCD camera displays on the monitor is shown in FIG. 5. As the chopper rotates, the right beam is allowed through, then blocked, then the left beam is allowed through, then both are blocked, and so on. This causes a "blinking" of the fluorescence emanating from the core of the fiber. When the beams are blocked, the blinking pattern seems paused due to the chopper having only one open area. Thus, as the chopper rotates at a constant rate, the beams are blocked for a longer period of time than the beams are allowed through. In the sequence shown in FIG. 5, this type of pattern may be considered as pointing to the right, or a right "turn signal."

This is because after the pause (in sequence frame #3), the light pattern would appear on the left at 302, then the right at 304, then blocked, then at the left at 306, as if marching down the fiber towards the right in the image.

It was found that the appearance of a right or left "turn signal" pattern indicated that we were not in focus in the z direction. When the two "blinks" overlapped one another (i.e. no pointing direction could be determined), then the UV beams were properly focused along the Z-axis. To assist in determining when the "blinks" overlapped, an oscilloscope was used to display a Gaussian shape at the location of the left or right UV fluorescence. The peak of the Gaussian could be adjusted to line up with the oscilloscope display grid, making it easier to determine when both peaks overlapped spatially. This method allowed z-axis focusing accuracies of one micron or less.

Because the coating of the fiber as well as the core fluoresced when impinged upon by UV light, we used apparent fluorescent strength to determine proper y-axis alignment. We noticed that when the UV beam illuminated mostly the core, the apparent brightness of the "blinks" was stronger. Thus, to locate the correct y-alignment, we moved the fiber in small increments up and down using a translation stage until we located the brightest spot. Additionally, by using a lamp directed at the prism from the side, we could illuminate the fibers and could judge when the UV spots appeared to be centered on the fiber. This was not as accurate as the relative fluorescence strength because it was highly dependent on the lamp's illumination angle of a given fiber. Typical accuracies using the fluorescence strength method were within 10 microns in the y-direction, but the lamp illumination method yielded y-axis focusing errors as great as 50–75 microns.

We claim:

1. A method of forming a grating or tap in the core of an optical fiber, comprising the steps of:

directing interfering beams of light at the core region of the fiber;

providing an optical detector to reveal a fluorescence pattern emanating from the core region; and determining whether the interfering beams are precisely aligned at the core region by observing the fluorescence pattern.

2. The method of claim 1, wherein:

the optical detector is fluorescing paper or a conversion screen; and the fluorescence pattern is in the form of one or more lines visible on the fluorescing paper or conversion screen.

3. The method of claim 2, wherein the lines visible on the fluorescing paper or conversion screen are C-shaped.

4. The method of claim 2, including:

a plurality of lines visible on the fluorescing paper or conversion screen; and precise alignment is achieved when two of the lines are generally symmetrical.

5. The method of claim 2, including:

a plurality of lines visible on the fluorescing paper or conversion screen; and alignment is off when two of the lines have different shapes.

6. The method of claim 1, wherein the interfering beams of light are ultraviolet.

7. The method of claim 1, further including the steps of alternately interrupting the interfering beams of light at the core region of the fiber.

* * * * *